C. P. HOWELL.
Hoe.
No. 85,384.
Patented Dec. 29, 1868.
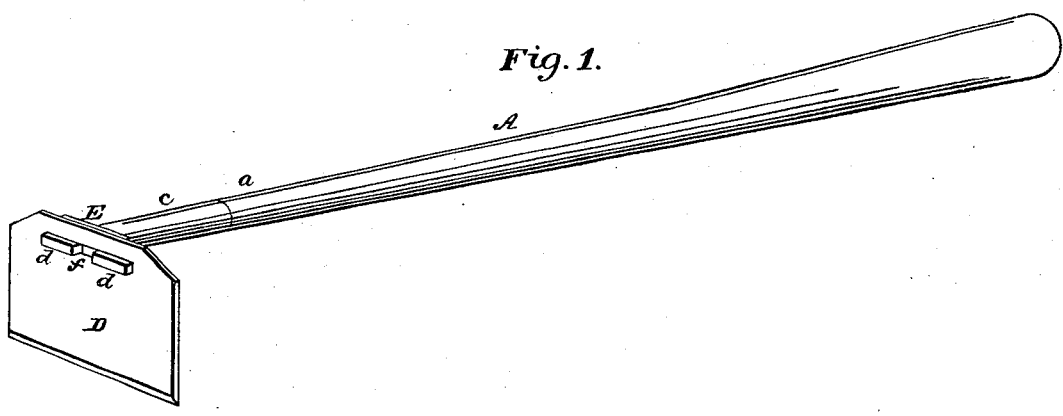
Fig. 1.
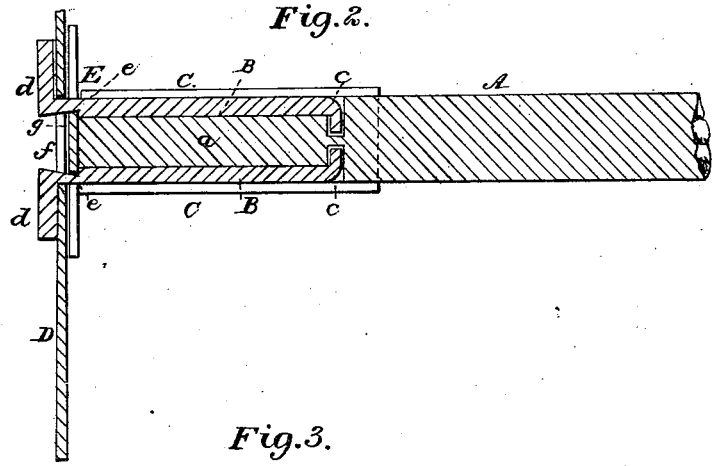
Fig. 2.
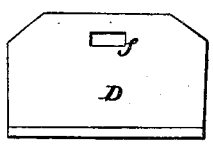
Fig. 3.
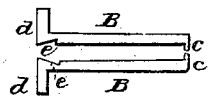
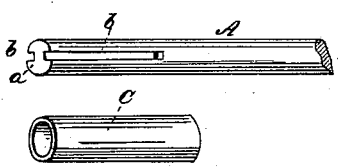
Witnesses:
A. J. Gibson
J. C. L. Fisher
Inventor:
Charles P. Howell

CHARLES P. HOWELL, OF COVINGTON, KENTUCKY.

Letters Patent No. 85,384, dated December 29, 1868.

IMPROVEMENT IN HOES.

The Schedule referred to in these Letters Patent and making part of the same.

*To all whom it may concern:*

Be it known that I, CHARLES P. HOWELL, of Covington, in the county of Kenton, and the State of Kentucky, have invented a new and useful Improvement in Hoes, of which the following is a full and clear description, reference being had to the accompanying drawings, making part of this specification.

The nature of my improvement in hoes consists in the manner of securing the blade of the hoe to the handle thereof, by means of clamping-bars and an adjustable ferrule, which, when pressed down over the clamping-bars, causes the most rigid union of the blade and handle of the hoe.

Figure 1 is a perspective view of my improved hoe.

Figure 2 is a longitudinal section of the same.

Figure 3 are parts of the hoe detached from each other.

A is the handle of the hoe, the small end, $a$, of which is provided with grooves, $b$, two in number, located on opposite sides.

Clamping-bars B, of a size adapting them to occupy the grooves $b$, and to be curved by the ferrule C, have their inner ends, $c$, turned in at an angle of ninety degrees. The opposite outer ends of the clamping-bars have their ends, $d$, turned out at an angle of ninety degrees. The ends $d$ are larger than the inner ends $c$.

Shoulders $e$, on the faces of the clamping-bars, which are pressed in contact with the handle of the hoe, have lengths, back from the outer ends $d$ of the bars B, equal to double the thickness of the hoe-blade.

The blade D of the hoe is of any desirable shape, and is perforated, $f$. This perforation is occupied by the ends of the clamping-bars.

The H-shaped piece of metal, E, has the cross-bar $g$, of such a width that when in place between the blade D and the shoulders $e$ of the clamping-bars B, the outer ends $d$ are brought into close contact with the blade D, when the ferrule is in place over the clamping-bars, as represented in figs. 1 and 2.

As at present constructed, the hoe is not as economical as desired, for, when the blade or handle is destroyed, the part is not as readily renewed nor as quickly replaced.

The object of my invention is to enable the person who uses the implement to remove or replace the blade or handle readily and with facility, when it is desired.

In order to remove the blade of the hoe, the ferrule C is forced up towards the opposite end of the handle A, uncovering the clamping-bars B, which are then removed from the grooves $b$ in the handle A. Their inner ends $c$ are widely separated, when the brace-piece E may be removed, and the clamping-bars B withdrawn from the perforation in the blade D. A new blade (or in place thereof, a rake may be used) is then adjusted to the clamping-bars, which are secured to the handle, the return-points $c$ entering and confined in recesses in it, by the ferrule C.

What I claim as new, and desire to secure by Letters Patent, is—

1. The clamping-bars B, constructed substantially as herein described.

2. The clamping-bars B, in combination with the brace-piece E, blade D, ferrule C, and handle A, or their equivalent, when constructed and arranged in the manner and for the purpose shown and described.

CHARLES P. HOWELL.

Witnesses:
 C. L. FISHER,
 A. J. GIBSON.